June 29, 1954        R. KELLER        2,682,630

SPEED REGULATING SYSTEM FOR DIRECT CURRENT MOTORS

Filed April 30, 1952

INVENTOR:-
Robert Keller,

BY Pierce, Scheffler & Parker,
ATTORNEYS.

Patented June 29, 1954

2,682,630

UNITED STATES PATENT OFFICE 2,682,630

SPEED REGULATING SYSTEM FOR DIRECT CURRENT MOTORS

Robert Keller, Ennetbaden, Switzerland, assignor to Aktiengesellschaft Brown, Boveri & Cie., Baden, Switzerland Application April 30, 1952, Serial No. 285,287

Claims priority, application Switzerland May 1, 1951

9 Claims. (Cl. 318—82)

The present invention concerns an arrangement for regulating the speed of direct-current motors which are supplied from grid-controlled rectifiers connected to a common alternating-current system, the grid control voltage of the rectifier feeding the direct-current motor whose speed is to be regulated being supplied by an alternating-current control machine which is mechanically coupled with the direct-current motor in question. According to the invention in order to obtain a speed regulation with as small a time constant as possible, the control machine is so constructed that when there is a change in speed of the direct-current motor this causes an alteration in the phase position of the stator current of the alternating-current machine corresponding to its slip, and this phase displacement results directly in such an advancement or retardation of the ignition instant of the rectifier supplying the controlled motor that the speed deviation of the latter is compensated.

Figure 1:
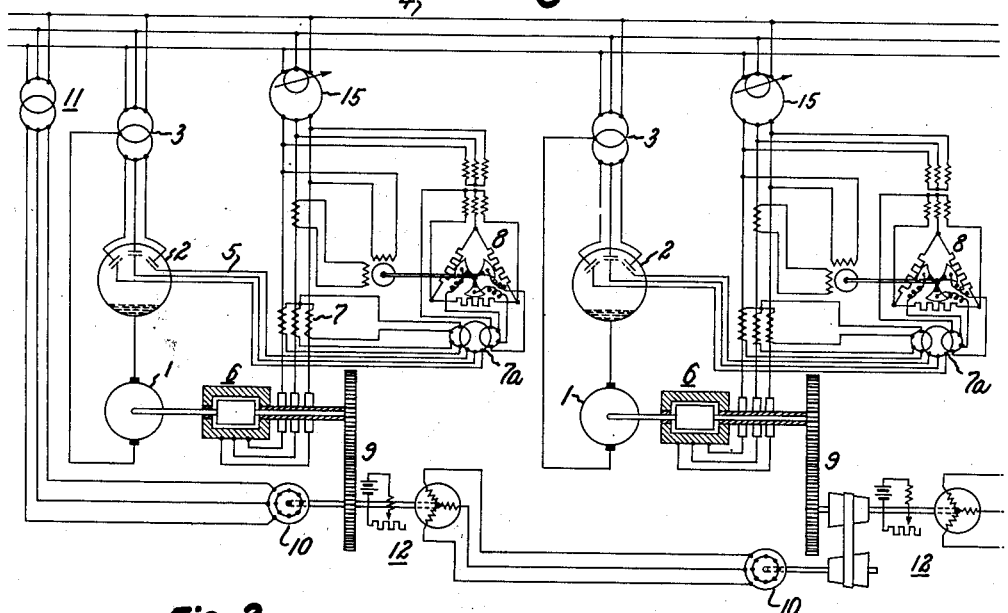
Figure 2:
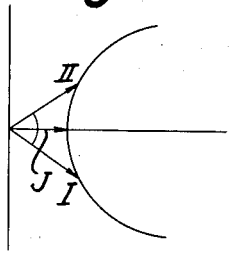
Figure 3:
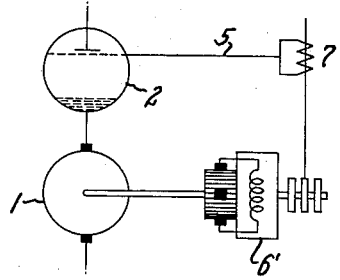
Figure 4:
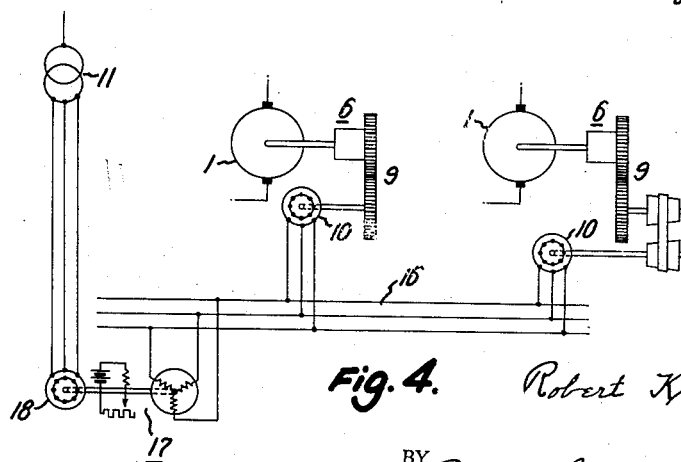

A constructional example of the invention is illustrated schematically in the accompanying drawing where Fig. 1 shows an arrangement for driving a multi-stand rolling mill; Fig. 2 shows a vector diagram of the currents; Fig. 3 is a fragmentary diagram illustrating another type of control machine; and Fig. 4 is a fragmentary diagram of a modified system in which the control motors are connected in parallel.

The direct-current motors 1 of the individual stands, which are not shown in the drawing, are supplied over the grid controlled rectifiers 2 and transformers 3 from a common alternating current-system 4. The grid control circuits are indicated by reference numeral 5. Each driving motor is mechanically coupled to an alternating-current speed control machine 6. This machine 6 can be for instance a non-synchronous motor, the rotor of which is driven by the direct-current motor 1 and the stator of which is supplied from the alternating-current system 4 over an induction regulator 15 which affords a rough adjustment of the phase position of the main current when starting up. Voltages corresponding to the stator current are supplied over current transformers 7 and one set of primary windings of the voltage transformer 7a to the grid control circuits 5 and serves to regulate the speed of the driving motors 1 in the manner described below.

At no-load, non-synchronous motor 6 which is mechanically coupled to direct-current motor 1 runs as a generator and its stator current will have the phase position I as indicated in the current vector diagram shown in Fig. 2. As soon as motor 1 is loaded, its speed will drop and thus also that of non-synchronous machine 6. This causes the phase of the stator current to be displaced and corresponding to the slip of motor 6 it now occupies the position II shown in the vector diagram, that is the lag of the current with respect to the voltage is decreased. The shift from position I to position II results in a voltage occurring on the control grids of rectifier 2, this voltage having a phase corresponding to that of the current J. This bias voltage causes the firing point of the rectifier to be displaced in the leading sense so that the rectifier voltage increases and the drop in speed of motor 1 when on load is substantially compensated. When there is a change in load in the opposite sense, that is when the load decreases, the firing point of rectifier 2 is shifted analogously in the opposite direction, that is retarded, by means of a corresponding phase shift of the stator current of the non-synchronous motor 6. The torque of motor 6 is very small when compared with that of D. C. motor 1. This speed regulating system is fundamentally static and stable, so that the loss in speed which occurs when the motor is loaded is not entirely compensated, but is nevertheless sufficient for most purposes.

The regulating system can also be of the astatic type and for this purpose a zero load regulator 8 is located in the supply lead to motor 6. This regulator, for instance of the rolling-sector type, always regulates to zero load and when deviations occur from this value additional control voltages are supplied by regulator 8 and another set of primary windings of the voltage transformer 7a to the grid control circuits 5 and due to its effect on rectifier 2 maintains the speed of direct-current motor 1 exactly constant. As a result of the action of regulator 8, the rotor of motor 6 will always rotate synchronously, that is it regulates to zero slip.

In order to be able to maintain the speed of the direct-current motors 1 constant at any desired value, that is to be able to adjust the predetermined speed to suit the prevailing operating conditions, a further variable factor has to be introduced. For this purpose the stator of non-synchronous motor 6 is driven over a gear 9 by a master motor 10, for instance a three phase commutator motor, this latter motor being supplied over transformer 11 from alternating current network 4. The desired predetermined value at which the speed of motor 1 has to be kept constant is then adjusted on motor 10 by shifting the brushes.

With the arrangement shown in Fig. 1 it is also possible for instance in the case of a multi-stand continuous rolling mill to maintain the speed ratio between successive stands constant. In this case the master motor 10 of each driving group has to be mechanically coupled with a master generator 12 and this latter feeds the master motor of the next stand. With this series arrangement of the master groups, all non-synchronous motors of the second and subsequent groups are synchronised and as soon as the speed of one alters, the speed of those following will adjust itself to the same extent.

It is also possible to connect the driving motors of control machines 6, that is master motors 10, in parallel as shown in Fig. 4. In this case the motors 10 are connected in parallel to an auxiliary three phase line 16 which is fed from a generator 17 driven by a motor 18 which is supplied over transformer 11 from the primary network 4. In this event the tensile stress setting for the material in each stand, which is regulated by the conical pulleys 13, has to be synchronised, so that it is possible to make the necessary adjustment to suit the altered speed.

The control machine which is mechanically coupled with driving motor 1 can also be in the form of a shunt type commutator motor 6' (see Fig. 3), instead of a non-synchronous machine. The prescribed speed setting is then obtained by shifting the brushes on the motor so that a special master motor is no longer required for this purpose. The commutator motor should preferably have a shunt characteristic and in order to obtain as big an angle $\phi$ (Fig. 2) as possible for the phase shift between no-load and full load, it is an advantage to reduce the no-load motor current J by some suitable compensating means.

I claim:

1. In an arrangement for regulating the speed of direct-current motors which are supplied over grid-controlled rectifiers from a common alternating current system and where the grid voltage of the rectifier supplying the motor whose speed is to be regulated is obtained from an alternating-current control machine which is mechanically coupled with the direct-current motor, the combination of a source of alternating current, a direct current motor, a grid controlled rectifier connected to said source and having said motor in the direct current output circuit thereof, a control machine having a rotor driven by said direct current motor and a stator supplied through current leads connected to said source, grid circuit means for controlling the ignition timing of said rectifier, means for rotating the stator of said control machine at a preselected speed to determine the speed of said direct current motor, and current transformer means coupling said stator supply leads to said grid circuit means to vary the ignition timing of said rectifier in response to the phase shift of the stator current on variation of the speed at which said rotor is driven by said direct current motor.

2. An arrangement as in claim 1, characterised by the feature that the control machine is a non-synchronous motor whose rotor is mechanically coupled with the direct-current motor.

3. An arrangement as in claim 2, characterised by the feature that the stator of the non-synchronous motor is driven by a master motor connected to the alternating-current network.

4. An arrangement as in claim 1, characterised by the feature that the control machine is a commutator motor whose speed is varied by brush shifting.

5. An arrangement as in claim 4, characterised by the feature that the control machine is constructed as a shunt-type commutator motor.

6. An arrangement as in claim 4, characterised by the feature that the phase shift limits for the stator current are increased by providing compensation means for the no-load motor current.

7. An arrangement as in claim 1, characterised by a no-load regulator in the current supply lead to the control machine, said regulator providing an additional bias voltage to the grid circuit means so as to maintain the speed of the direct-current motor constant.

8. An arrangement as in claim 1 for keeping constant the speed ratio of successive stands in a continuous rolling mill, characterised by the feature that each mill stand includes a direct current motor, a grid controlled rectifier, a control machine, and a master motor constituting said means for rotating the stator of said control machine; and that each master motor is coupled to a master generator which feeds the master motor of the next stand.

9. An arrangement as in claim 3, for regulating the speed of continuous multi-stand rolling mills, characterised by the feature that each mill stand includes a direct current motor, a grid controlled rectifier, a control machine, and a master motor constituting said means for rotating the stator of said control machine; and that the driving motors of the control machines are connected in parallel.

References Cited in the file of this patent

UNITED STATES PATENTS

| Number | Name | Date |
|---|---|---|
| 1,981,040 | Gulliksen | Nov. 20, 1934 |
| 2,287,459 | Uehling | June 23, 1942 |
| 2,448,793 | Glass | Sept. 7, 1948 |
| 2,471,916 | Volz | May 31, 1949 |
| 2,472,736 | Waterman | June 7, 1949 |